US008568151B2

(12) United States Patent
Cheng

(10) Patent No.: US 8,568,151 B2
(45) Date of Patent: Oct. 29, 2013

(54) CONCEALABLE CONNECTOR AND ELECTRONIC DEVICE HAVING THE CONCEALABLE CONNECTOR

(75) Inventor: Yen-Chang Cheng, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 367 days.

(21) Appl. No.: 12/821,728

(22) Filed: Jun. 23, 2010

(65) Prior Publication Data

US 2011/0147036 A1 Jun. 23, 2011

(30) Foreign Application Priority Data

Dec. 22, 2009 (TW) ................................ 98224006 U

(51) Int. Cl.
*H01R 13/46* (2006.01)
(52) U.S. Cl.
USPC ....... 439/131; 361/679.38; 439/159; 439/160
(58) Field of Classification Search
USPC ........... 174/51, 50, 17 R, 58, 60, 63, 64, 559;
361/679, 685; 382/115; 206/725;
242/338; 455/90; 221/232; 439/131,
439/535
See application file for complete search history.

(56) References Cited

U.S. PATENT DOCUMENTS

| | | | | |
|---|---|---|---|---|
| 5,793,607 A | * | 8/1998 | Karidis et al. | 361/679.38 |
| 5,950,865 A | * | 9/1999 | Menes | 221/232 |
| 6,000,654 A | * | 12/1999 | Hirabayashi | 242/338.4 |
| 6,141,211 A | * | 10/2000 | Strickler et al. | 361/679.31 |
| 6,309,230 B2 | * | 10/2001 | Helot | 439/131 |
| 6,469,900 B2 | * | 10/2002 | Cheng | 361/726 |
| 6,475,003 B2 | * | 11/2002 | Jones et al. | 439/131 |
| 6,524,122 B1 | * | 2/2003 | Johnson et al. | 439/131 |
| 6,980,422 B2 | * | 12/2005 | Bhogal | 361/679.55 |
| 7,102,882 B2 | * | 9/2006 | Shin | 361/679.55 |
| 7,200,002 B2 | | 4/2007 | Peng et al. | |
| 7,389,878 B1 | * | 6/2008 | Torrico | 206/725 |
| 7,483,262 B2 | * | 1/2009 | Yin et al. | 361/679.01 |
| 7,733,643 B1 | * | 6/2010 | Rumpf | 361/679.43 |
| 7,948,747 B2 | * | 5/2011 | Ajo et al. | 361/679.33 |
| 2009/0124216 A1 | * | 5/2009 | Lintern et al. | 455/90.1 |
| 2011/0085294 A1 | * | 4/2011 | Jacobs et al. | 361/679.37 |

* cited by examiner

*Primary Examiner* — Boris L. Chervinsky
*Assistant Examiner* — Pete Lee
(74) *Attorney, Agent, or Firm* — Nixon & Vanderhye P.C.

(57) ABSTRACT

A concealable connector disposed in a housing of an electronic device includes two upright sidewalls, a guiding groove, a guiding rod, and a sliding module. The upright sidewalls are spaced apart from each other and are disposed in the housing. The guiding groove is formed in the housing and is interposed between the upright sidewalls. The guiding rod has a first end extending slidably into the guiding groove, and a second end connected to the sliding module. The sliding module has input/output connectors disposed therein. The sliding module is slidable relative to the upright sidewalls between a slid-out state, in which the sliding module projects outwardly of the housing and the input/output connectors are exposed from the housing, and a concealed state, in which the input/output connectors are concealed by the housing.

14 Claims, 10 Drawing Sheets

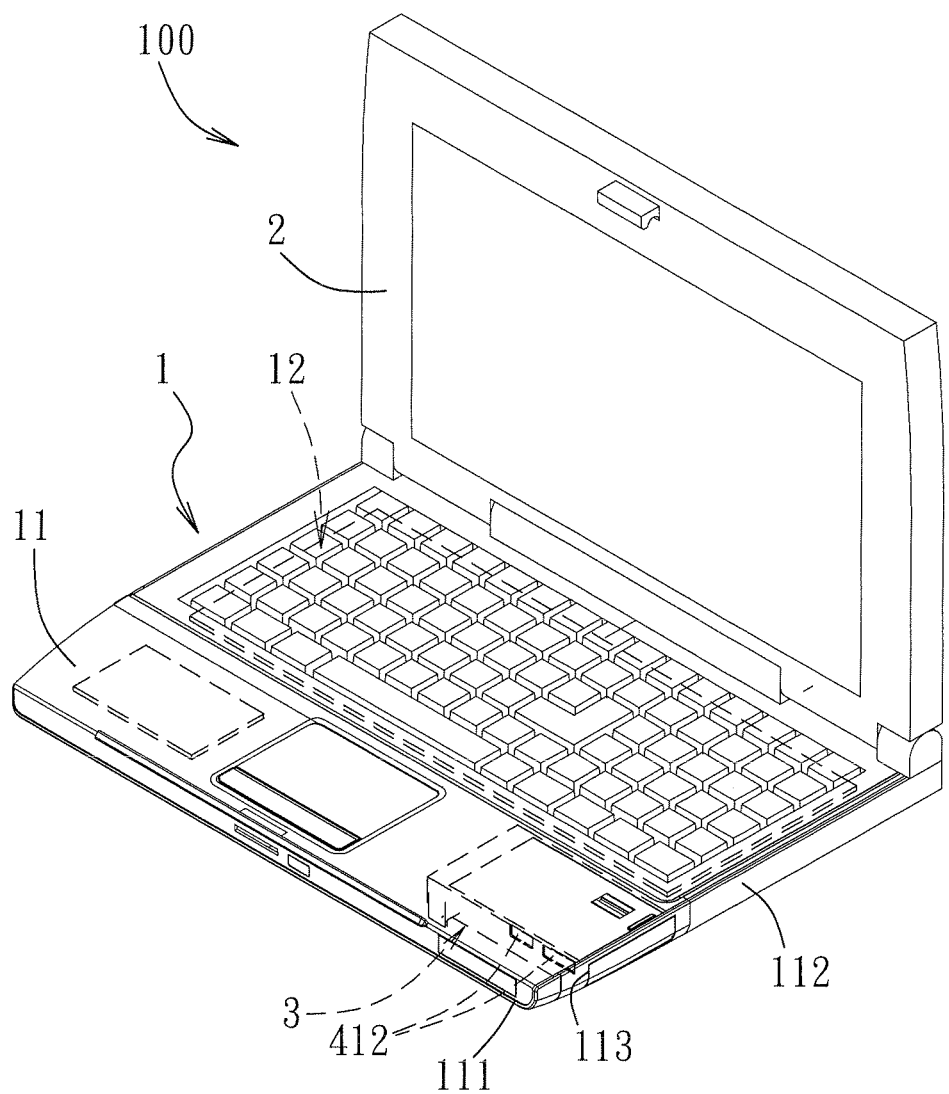
F I G. 1

CONCEALABLE CONNECTOR AND ELECTRONIC DEVICE HAVING THE CONCEALABLE CONNECTOR

CROSS-REFERENCE TO RELATED APPLICATION

This application claims priority of Taiwanese Application No. 098224006, filed on Dec. 22, 2009.

BACKGROUND OF THE INVENTION

1. Field of the Invention

The invention relates to an electronic device, more particularly to an electronic device having a concealable connector, and a concealable connector to be disposed in an electronic device.

2. Description of the Related Art

An input/output connection port (such as a universal serial bus (USB), a PS/2 port, an RJ45 port, etc.) of a conventional computer device is disposed directly in a housing of the computer device to be accessible externally for connection with a peripheral device, such as a mouse, a keyboard, a network cable, etc. In the case of a notebook computer, limited spaces at peripheral edges of the computer device are available for arrangement of connection ports of various specifications.

U.S. Pat. No. 7,200,002 discloses an input/output connection port module which can be flipped over and hidden within a housing of an electronic device when not in use by virtue of a latch mechanism, so as to facilitate use and to provide a dustproof effect while maintaining the integral appearance of the housing.

SUMMARY OF THE INVENTION

Therefore, an object of the present invention is to provide a mechanism that permits a connector to be concealed within a housing of an electronic device when not in use, and the connector.

Accordingly, a concealable connector of this invention is for disposing in a housing of an electronic device. The housing has a base wall and a housing edge. The housing edge is provided with an opening. The concealable connector includes two upright sidewalls, a guiding groove, a guiding rod, and a sliding module. The upright sidewalls are spaced apart from each other and are disposed on the base wall. The opening is in spatial communication with a space between the upright sidewalls. The guiding groove is formed in the base wall and is interposed between the upright sidewalls. The guiding rod has a first end extending slidably into the guiding groove, and a second end. The sliding module includes a casing, a circuit board unit, and an input/output port. The casing is disposed between the upright sidewalls and is formed with an insertion slot. The second end of the guiding rod is pivoted to the casing. The casing is slidable relative to the upright sidewalls between a slid-out state, in which the casing projects outwardly of the housing through the opening and the insertion slot is exposed from the housing, and a concealed state, in which the insertion slot is concealed by the housing. The circuit board unit is disposed in the casing. The input/output port is connected electrically to the circuit board unit, and is exposed through the insertion slot.

The advantageous effect of the present invention resides in that, with the input/output port disposed within the casing, and through the cooperation between the guiding groove and the guiding rod, the casing can be slid out of the housing when use of the input/output port is needed, and can be slid into the housing to be concealed therein when use of the input/output port is not needed. This not only achieves the object of providing an increased number of connectors for an electronic device, the overall appearance of the housing can be maintained when use of the input/output port is not needed.

BRIEF DESCRIPTION OF THE DRAWINGS

Other features and advantages of the present invention will become apparent in the following detailed description of the preferred embodiment with reference to the accompanying drawings, of which:

FIG. 1 is a perspective view of a preferred embodiment of an electronic device having a concealable connector according to the present invention, showing a casing of a sliding module disposed in a concealed state;

DETAILED DESCRIPTION OF THE PREFERRED EMBODIMENT

Figure 2:
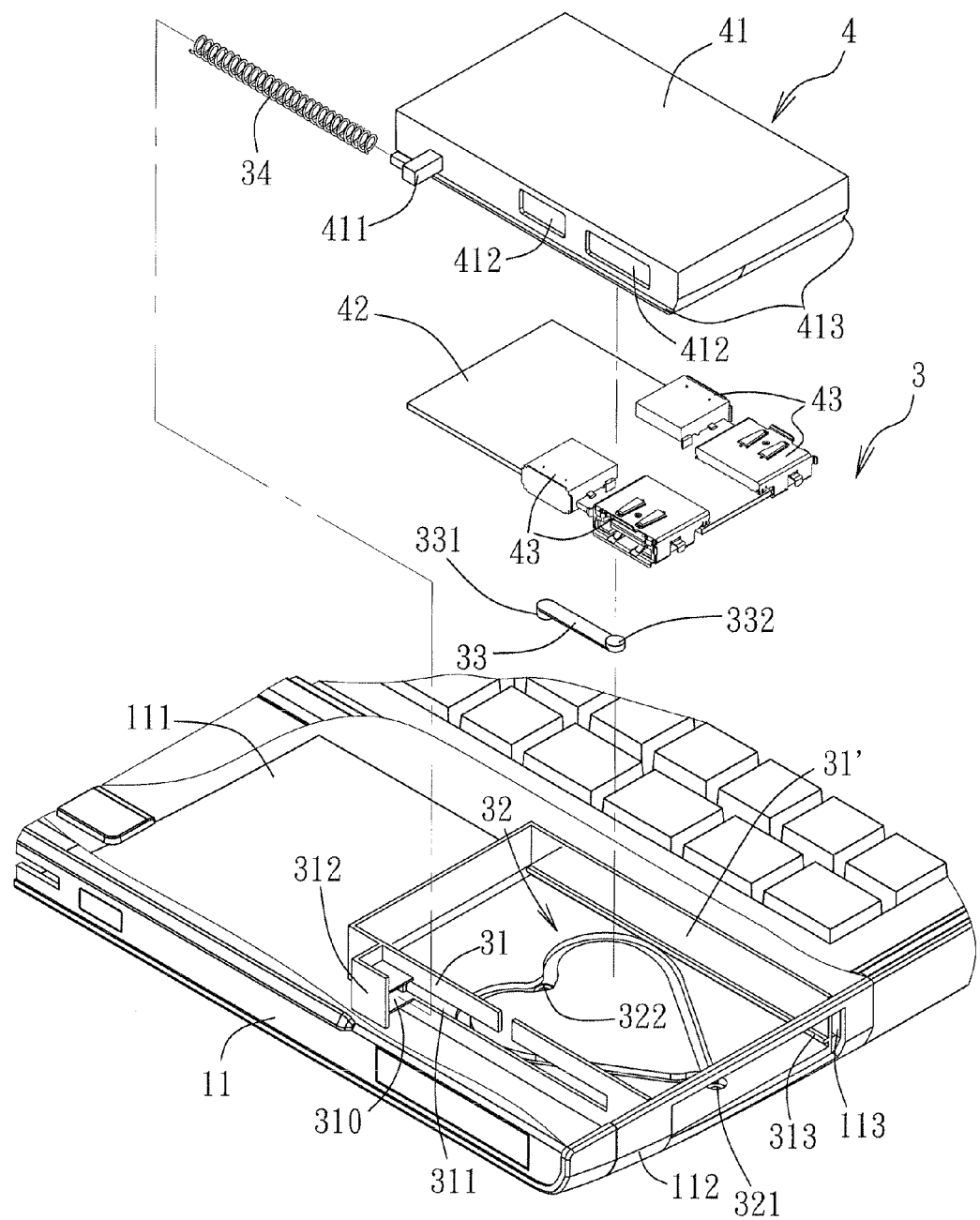
FIG. 2 is a fragmentary exploded perspective view of the preferred embodiment.

Before the present invention is described in greater detail, it should be noted that like elements are denoted by the same reference numerals throughout the disclosure.

Figure 3:
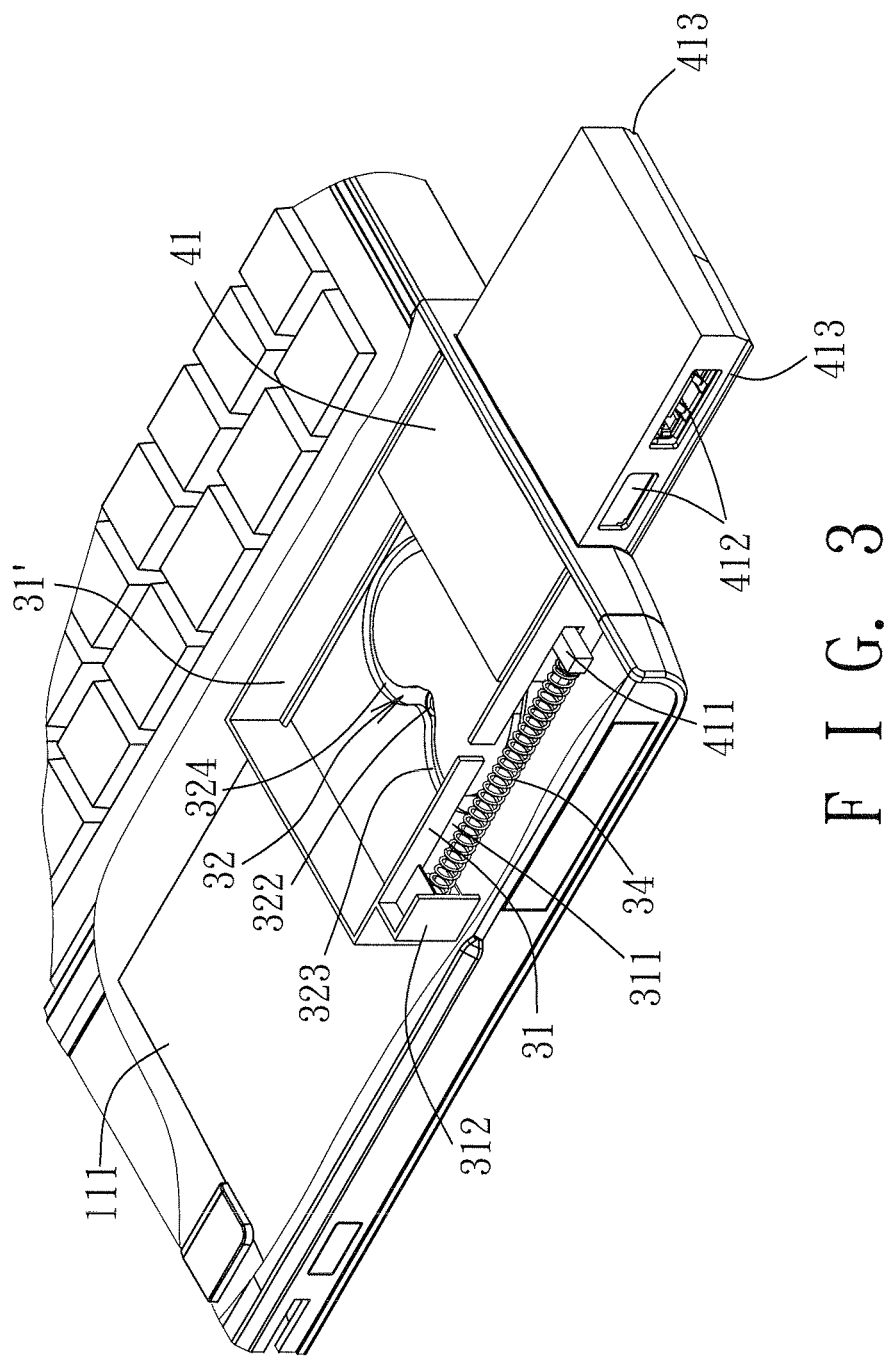
FIG. 3 is a fragmentary perspective view of the preferred embodiment, showing the casing of the sliding module in a slid-out state.

Referring to FIGS. 1 to 3, the preferred embodiment of an electronic device 100 having a concealable connector 3 according to the present invention is exemplified to be a notebook computer. The electronic device 100 includes a device body 1, a display 2 connected to the device body 1, and the concealable connector 3 disposed in the device body 1. However, the electronic device 100 should not be limited to a notebook computer, and may be a desk-top computer.

The device body 1 includes a housing 11 and an electronic component set 12 disposed in the housing 11. The housing 11 has a base wall 111 and a housing edge 112. The housing edge 112 is provided with an opening 113. In this embodiment, the base wall 111 is a bottom wall of the housing 11, and the housing edge 112 is, but is not limited to, a right lateral edge of the housing 11. The housing edge 112 may also be a left lateral edge, a front edge, or a rear edge. The electronic component set 12 includes a motherboard, a central processing unit disposed on the motherboard, and components, such as a hard disk, an optical disk drive, etc., which are connected to the motherboard and which are required for the normal operation of the device body 1.

Figure 4:
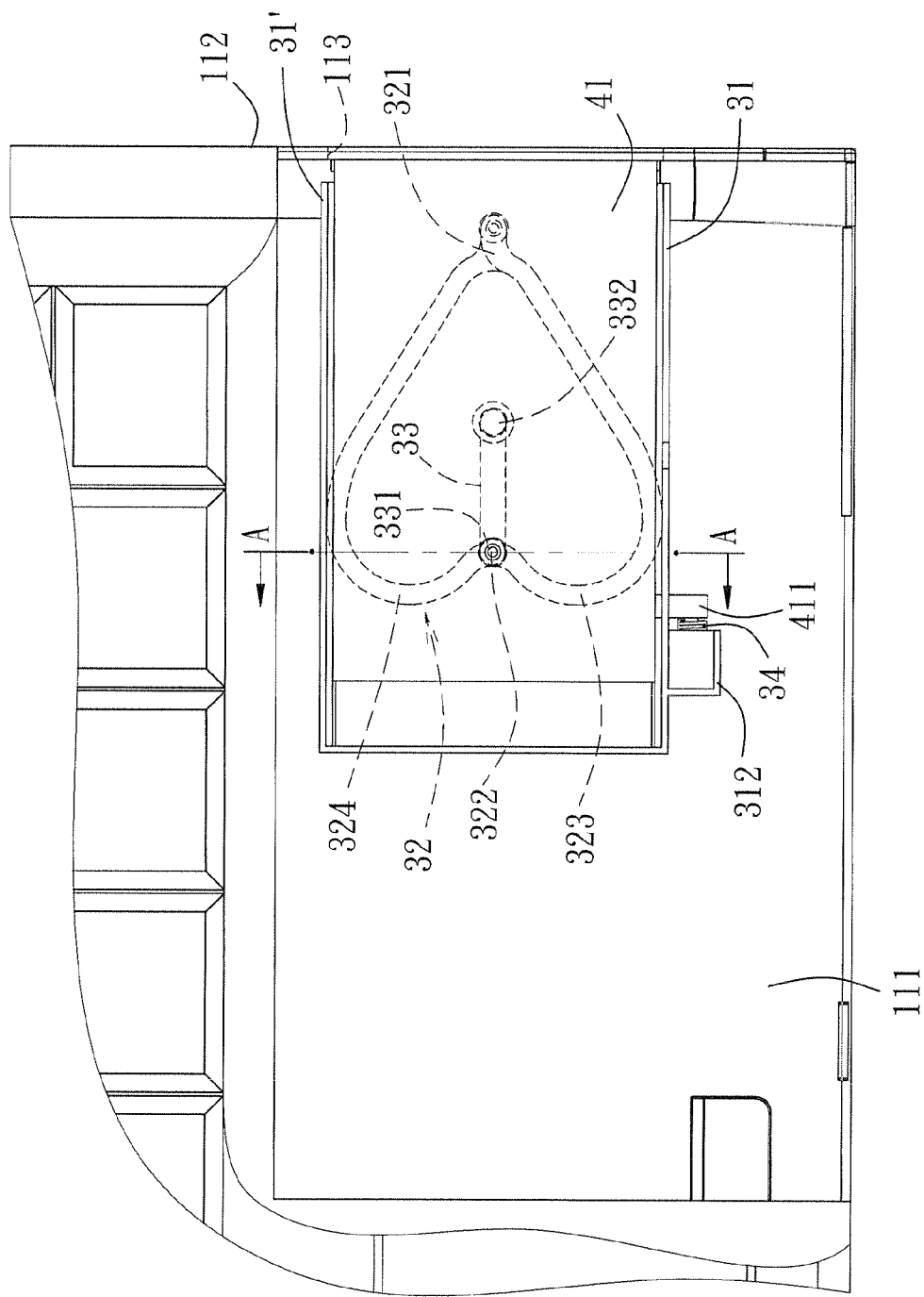
FIG. 4 is a fragmentary top view of the preferred embodiment, illustrating the casing in the concealed state.

Referring to FIGS. 2 to 4, the concealable connector 3 includes two upright sidewalls 31, 31', a guiding groove 32, a guiding rod 33, a sliding module 4, and a spring 34. The two upright sidewalls 31, 31' extend upwardly from the base wall 111 in a spaced apart relationship with one in front of the other, and are adjacent to the housing edge 112. The two upright sidewalls 31, 31' are so positioned such that the opening 113 in the housing edge 112 is in spatial communication with a space between the two upright sidewalls 31, 31'. The opening 113 is positioned between the two upright sidewalls 31, 31'. In this embodiment, the upright sidewall 31 is provided with a lateral guiding groove 311 extending in a left-right direction perpendicular to the housing edge 112. Furthermore, the upright sidewall 31 has one wall surface confronting the upright sidewall 31' and an opposite wall surface which is formed with a protruding mechanism 312 projecting therefrom. The protruding mechanism 312 is formed with a recess 310 having an opening directed toward the housing edge 112, and is located at one end of the lateral guiding groove 311 that is distal from the housing edge 112. The functions of the lateral guiding groove 311 and the protruding mechanism 312 will be described in the succeeding paragraphs.

The guiding groove 32 is formed in the base wall 111, is located in an area between the two upright sidewalls 31, 31', and has a first positioning end 321 and a second positioning end 322 which is farther from the housing edge 112 than the first positioning end 321. In this embodiment, the guiding groove 32 is configured to have a heart-shaped profile, and is divided into a slide-in travel segment 323 and a slide-out travel segment 324 which are substantially symmetric to each other. The slide-in travel segment 323 and the slide-out travel segment 324 meet at two junctures, which respectively define a pointed portion of the heart-shaped profile that is directed toward the housing edge 112 and an indented portion of the heart-shaped profile that is farther from the housing edge 112 than the pointed portion. The first positioning end 321 is located at the pointed portion of the heart-shaped profile. The second positioning end 322 is located at the indented portion of the heart-shaped profile. Furthermore, in this embodiment, the slide-in travel segment 323 has a greater depth than the slide-out travel segment 324 at the pointed portion, and the first positioning end 321 is located at a distal end of the slide-in travel segment 322. The slide-in travel segment 323 has a smaller depth than the slide-out travel segment 324 at the indented portion, and the second positioning end 322 is located at a distal end of the slide-out travel segment 324.

The guiding rod 33 has a first end 331 and a second end 332. The first end 331 of the guiding rod 33 is extendable slidably into the guiding groove 32. The second end 332 of the guiding rod 33 is pivoted to the sliding module 4.

The sliding module 4 includes a casing 41, a circuit board unit 42 disposed in the casing 41, and a plurality of input/output ports 43 disposed on the circuit board unit 42. In this embodiment, the casing 41 is a substantially hollow shell which may be cooperatively formed by two or more shell parts. The casing 41 is located between the two upright sidewalls 31, 31'. One side surface of the casing 41 that confronts the upright sidewall 31 is formed with a post 411 projecting forwardly therefrom. The post 411 is disposed to extend forwardly through the lateral guiding groove 311 in the upright sidewall 31. The spring 34 has one end received in the recess 310 in the protruding mechanism 312 and an opposite end abutting against the post 411 so as to provide a resilient force to bias the casing 41 to project outwardly of the housing 11 through the opening 113 at the housing edge 112.

The second end 332 of the guiding rod 33 is pivoted to a bottom portion of the casing 41, and the two side surfaces of the casing 41 that respectively confront the two upright sidewalls 31, 31' are respectively provided with a plurality of insertion slots 412. When the circuit board unit 42 is disposed within the casing 41, the input/output ports 43 disposed on the circuit board unit 42 correspond respectively to the insertion slots 412 and are accessible to the outside through the insertion slots 412. The input/output ports 43 may include connectors of various specifications, such as a USB port, a PS/2 port, an RJ45 port, etc., or connectors of card readers. Moreover, the circuit board unit 42 is connected electrically to the motherboard of the electronic component set 12 through wires.

Referring to FIGS. 1 and 4, when the casing 41 is disposed in a concealed state, the casing 41 is located between the two upright sidewalls 31, 31', is partly exposed through the opening 113 at the housing edge 112, and blocks the opening 113. At this point, the insertion slots 412 are completely located within the housing 11 and are concealed. In addition, since the post 411 is closer to the protruding mechanism 312 of the upright sidewall 31 at that point, the spring 34 is compressed and accumulates a resilient force. Because the first end 331 of the guiding rod 33 abuts against the second positioning end 322 of the guiding groove 32 at this time, the entire casing 41 will not be ejected outwardly of the casing 41 by the resilient force of the spring 34.

Figure 5:
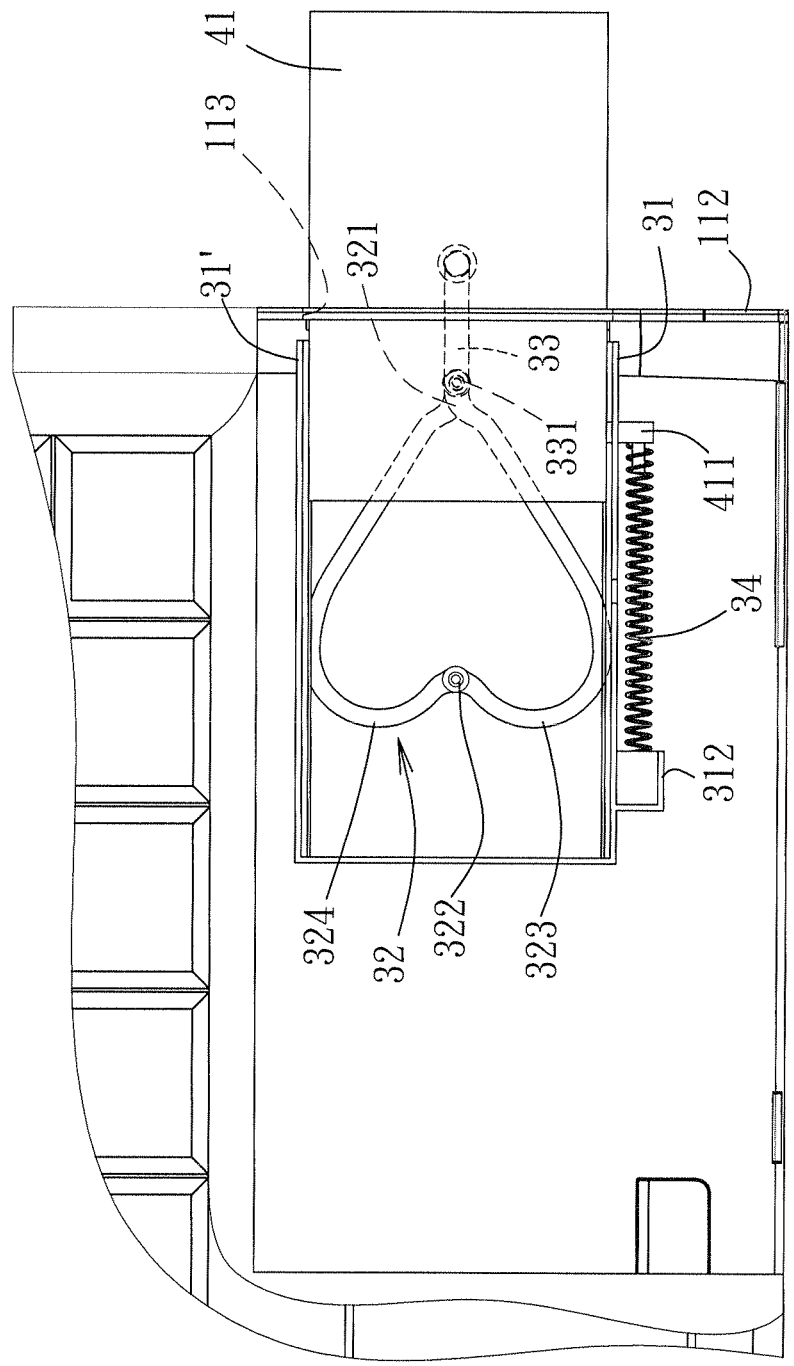
FIG. 5 is another fragmentary top view of the preferred embodiment, illustrating the casing in the slid-out state.

Referring to FIGS. 3 and 5, when a user needs to use the input/output ports 43, by pushing the portion of the casing 41 that is exposed through the opening 113 at the housing edge 112 inwardly, the first end 331 of the guiding rod 33 can be caused to slide toward the first positioning end 321 along the slide-out travel segment 324 by virtue of the resilient force of the spring 34 that is exerted on the post 411 such that the casing 41 projects outwardly of the housing edge 112 of the housing 11 through the opening 113 until the first end 331 of the guiding rod 33 abuts against the first positioning end 321 to thereby place the casing 41 in a slid-out state. At this point, the insertion slots 412 are completely exposed from the housing 11 and are available for use.

If the user does not need to use the input/output ports 43, by pushing the casing 41 projecting from the casing 11 in a direction toward the housing edge 112 to slide along the slide-in travel segment 323, the first end 331 of the guiding rod 33 can be caused to slide along the slide-in travel segment 323 toward the second positioning end 322 such that the casing 41 once again slides into the area between the two upright sidewalls 31, 31' of the housing 11 to be disposed in the concealed state. At this time, the insertion slots 412 are once again concealed by the housing 11.

Figure 6:
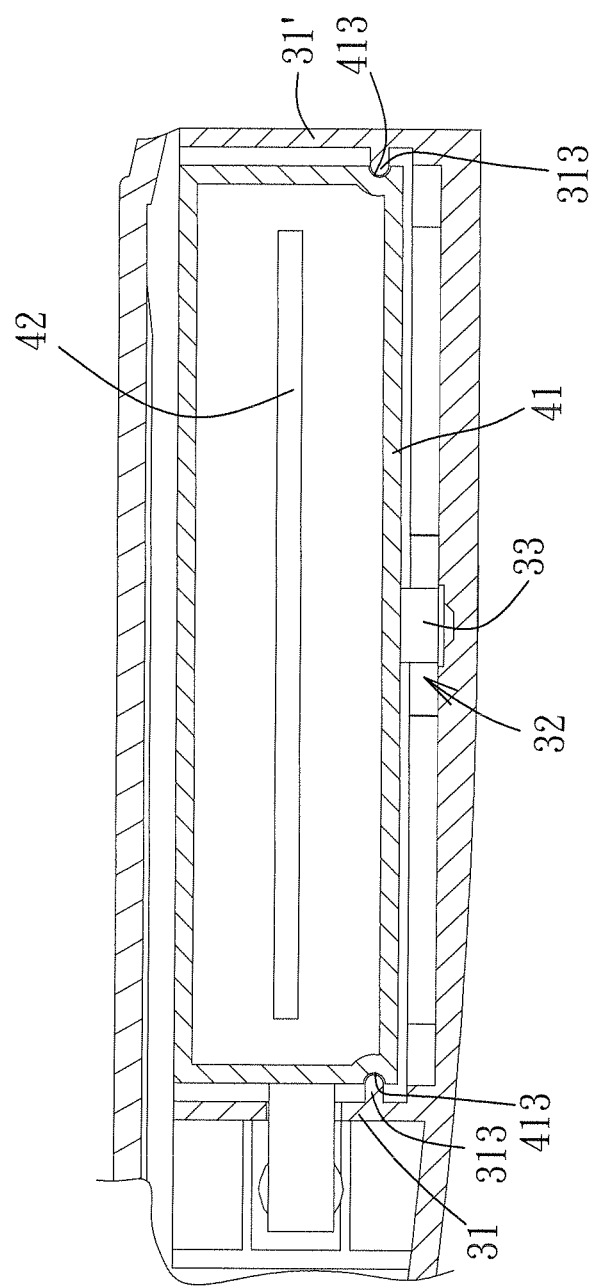
FIG. 6 is a sectional view taken along line A-A of FIG. 4.

Referring to FIGS. 2 and 6, to ensure smooth sliding of the casing 41 between the two upright sidewalls 31, 31', in this embodiment, the confronting wall surfaces of the two upright sidewalls 31, 31' are each formed with a flange 313 that extends along a lengthwise direction of the respective upright sidewall 31, 31', and outer side surfaces of the casing 41 that respectively confront the two upright sidewalls 31, 31' are each formed with an indentation 413. With the flanges 313 formed respectively on the two upright sidewalls 31, 31' and extending respectively into the indentations 413 formed in the two outer side surfaces of the casing 41, when the casing 41 slides relative to the two upright sidewalls 31, 31', the indentations 413 will also slide relative to the respective flanges 313, which has the effect of assisting and guiding sliding movement of the casing 41.

Figure 7:
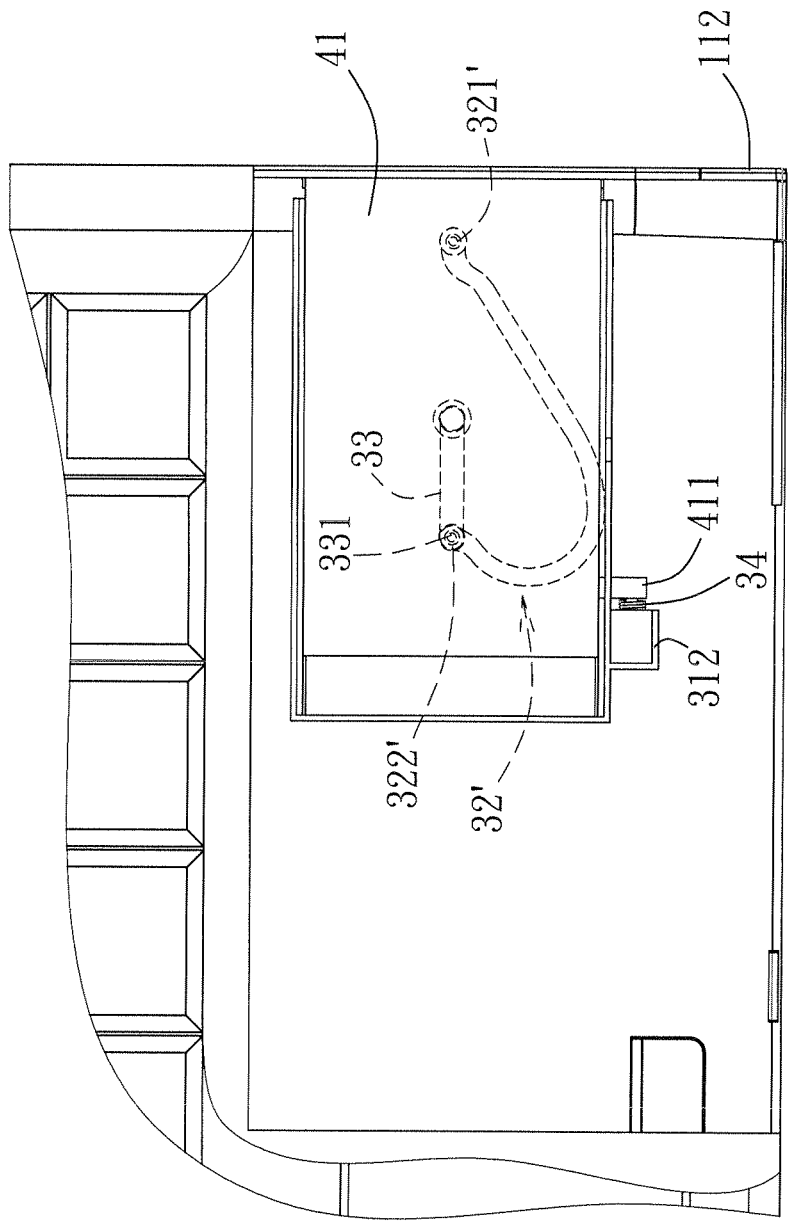
FIG. 7 is still another fragmentary top view of the preferred embodiment, illustrating a modified form of a guiding groove and the casing in the concealed state.
Figure 8:
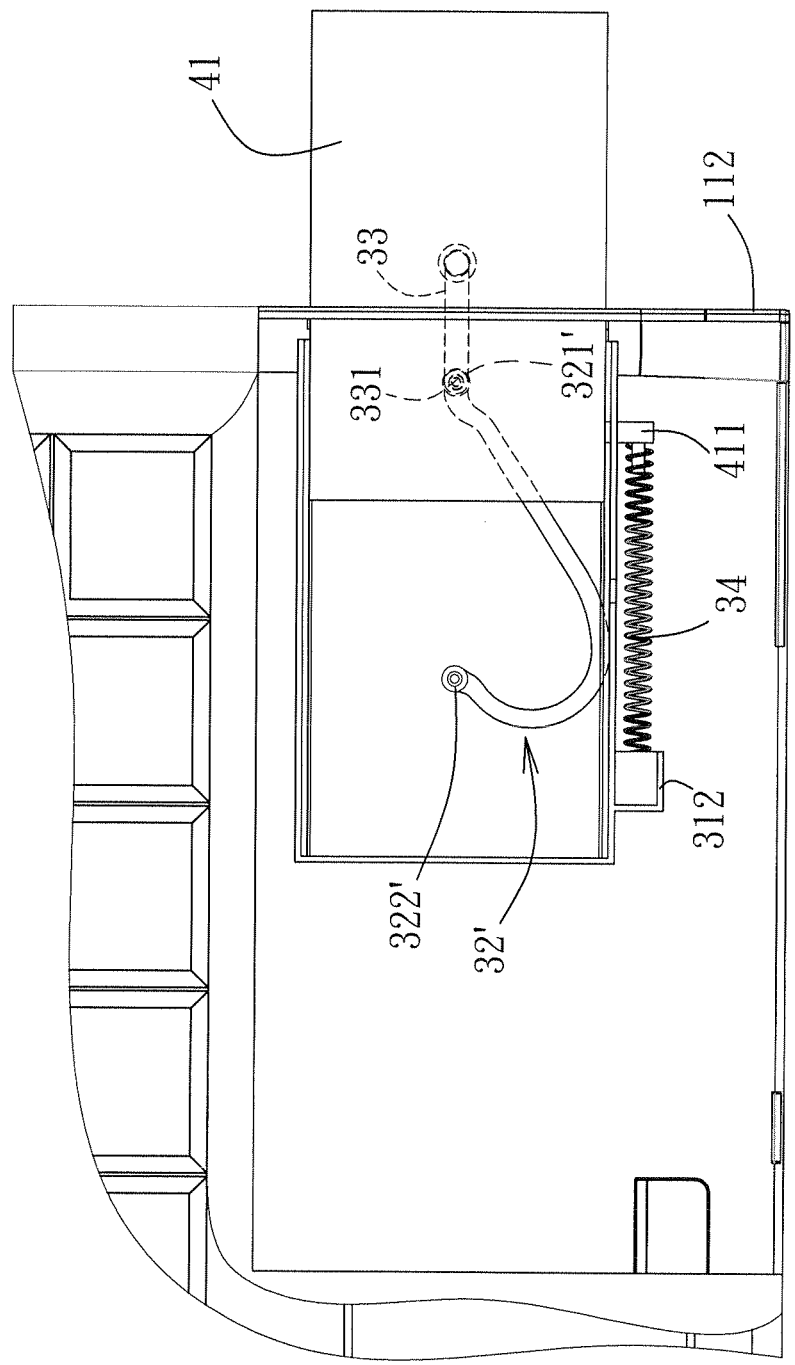
FIG. 8 is yet another fragmentary top view of the preferred embodiment, illustrating the modified form of the guiding groove and the casing in the slid-out state.

Reference is made to FIGS. 7 and 8, which illustrate a modification of the guiding groove 32'. Compared to the guiding groove 32 described hereinbefore, the guiding groove 32' includes only the slide-in travel segment 323 (see FIG. 4), i.e., the guiding groove 32' resembles the shape of a symmetric half of a heart. In other words, the slide-in travel segment and the slide-nut travel segment overlap. In this case, the end of the guiding groove 32' that is proximate to the housing edge 112 is the first positioning end 321', and the end of the same that is distal from the housing edge 112 is the second positioning end 322'. This configuration can likewise achieve the effect of guiding the first end 331 of the guiding rod 33 to slide along the guiding groove 32'.

Figure 9:
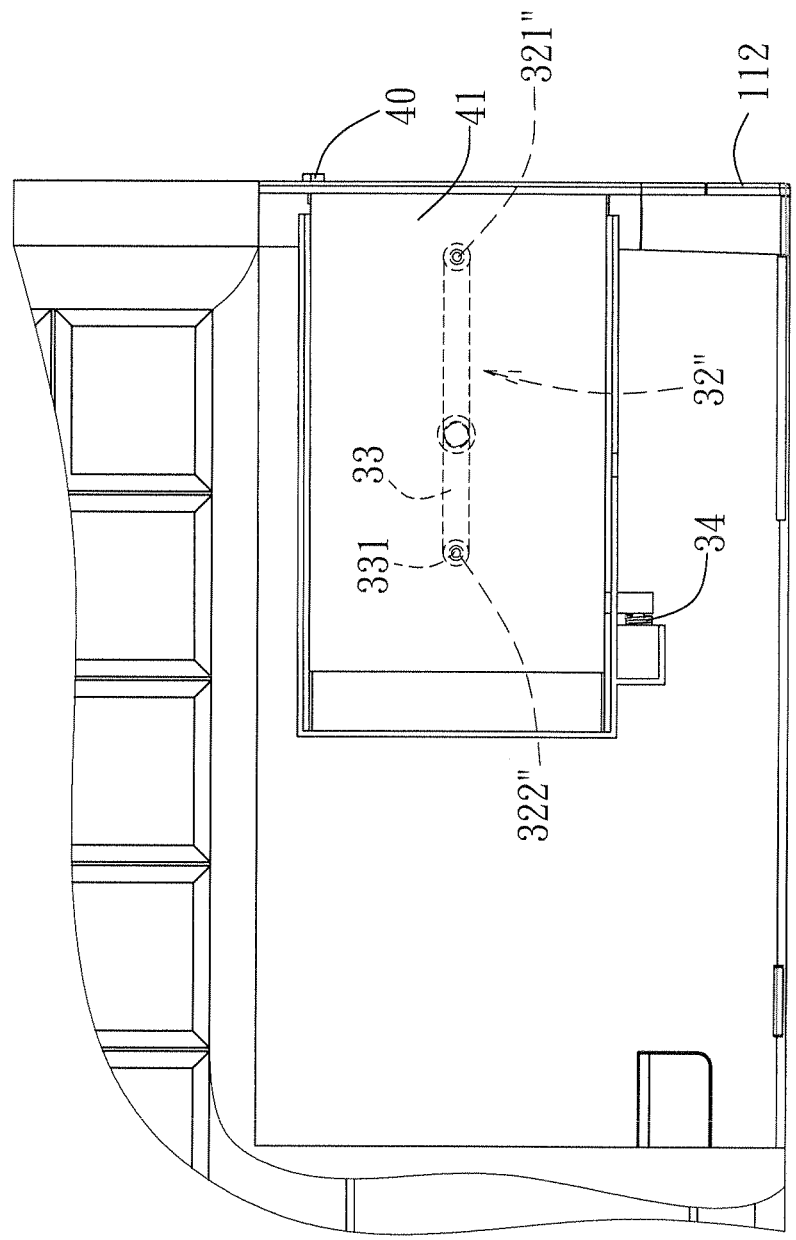
FIG. 9 is a further fragmentary top view of the preferred embodiment, illustrating another modified form of the guiding groove and the casing in the concealed state.
Figure 10:
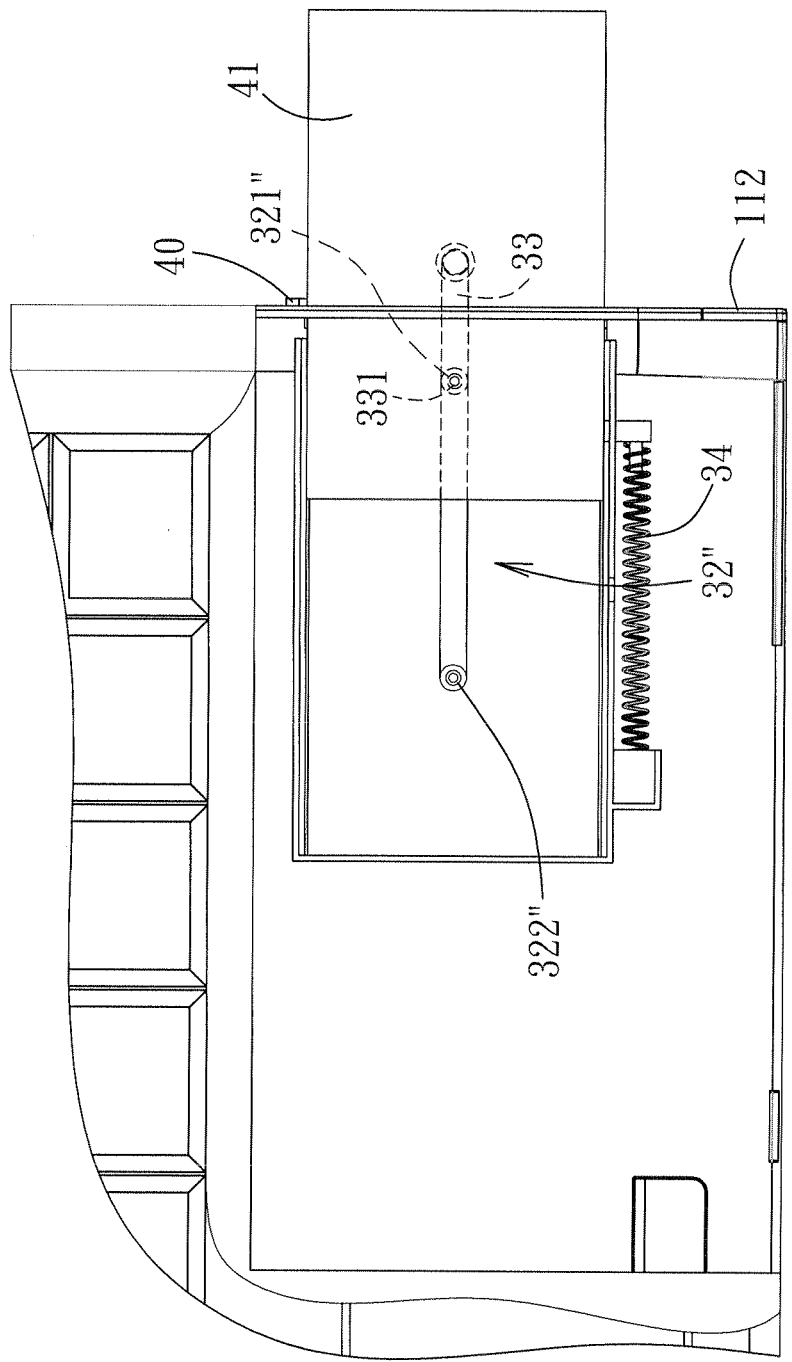
FIG. 10 is another further fragmentary top view of the preferred embodiment, illustrating said another modified form of the guiding groove and the casing in the slid-out state.

Reference is made to FIGS. 9 and 10, which illustrate another modification of the guiding groove 32". The guiding groove 32" is configured to be a linear groove extending in a direction perpendicular to the housing edge 112. In this case, the first positioning end 321" and the second positioning end 322" are two opposite ends of the guiding groove 32" Certainly, the guiding groove 32" may be configured to have various depths or to be deeper at the first positioning end 321" and the second positioning end 322" so that the first end 331 of the guiding rod 33 can be positioned at the first positioning end 321" and the second positioning end 322". Alternatively, the sliding module 4 may further include a stop mechanism or a retaining mechanism (such as a stop piece 40 disposed pivotably at the housing edge 112 of the housing 11 to be turned pivotably for blocking the portion of the casing 41 that is exposed through the opening 113) disposed on the housing 11 at a suitable position to stop or position the casing 41 that is in the slid-in state so as to avoid undesirable situations in which the casing 41 cannot be positioned in the slid-in state due to the biasing force of the spring 34.

In summary, with the input/output ports 43 disposed within the casing 41, and through the cooperation between the guiding groove 32, 32', 32" and the guiding rod 33, the casing 41 can be slid out of the housing 11 when use of the input/output ports 43 is needed, and can be slid into the housing 11 to be concealed therein when use of the input/output ports 43 is not needed. This not only achieves the object of providing an increased number of connectors for an electronic device, the overall appearance of the housing 11 can be maintained when use of the input/output ports 43 is not needed. Therefore, the present invention offers another mechanism or configuration to permit the connectors to be concealed within the housing 11 when they are not in use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A concealable connector for disposing in a housing of an electronic device, the housing having a base wall and a housing edge that is provided with an opening, said concealable connector comprising:
   two upright sidewalls spaced apart from each other and disposed on the base wall, the opening being in spatial communication with a space between said upright sidewalls;
   a guiding groove formed in the base wall and disposed between said upright sidewalls;
   a guiding rod having a first end that extends slidably into said guiding groove, and a second end; and
   a sliding module including
      a casing disposed between said upright sidewalls and formed with an insertion slot, said second end of said guiding rod being pivoted to said casing, said casing being slidable along said guiding groove by means of said guiding rod so as to be slidable relative to said upright sidewalls between a slid-out state, in which said casing projects outwardly of the housing through the opening and said insertion slot is exposed from the housing, and a concealed state, in which said insertion slot is concealed by the housing,
      a circuit board unit disposed in said casing, and
      an input/output port connected electrically to said circuit board unit and exposed through said insertion slot; and
      a spring to provide said casing with a resilient force to slide to the slid-out state,
   wherein one of said upright sidewalls is provided with a lateral guiding groove that extends in a direction the same as a sliding direction of said casing and is formed with a protruding mechanism which is disposed at one end of said lateral guiding groove distal from the housing edge, said sliding module further including a post projecting from one side of said casing and extending into said lateral guiding groove, and said spring abutting against said protruding mechanism and said post.

2. The concealable connector of claim 1, wherein said guiding groove has a first positioning end and a second positioning end disposed farther from the housing edge of the housing than said first positioning end, said first end of said guiding rod being disposed at said first positioning end when said casing is disposed in the slid-out state, said first end of said guiding rod being disposed at said second positioning end when said casing is disposed in the concealed state.

3. The concealable connector of claim 1, wherein said one of said upright sidewalls has one wall surface confronting the other of said upright sidewalls, and an opposite wall surface, said protruding mechanism being formed on and projecting from said opposite wall surface.

4. The concealable connector of claim 1, wherein said upright sidewalls have confronting wall surfaces each of which is provided with a flange that extends along a lengthwise direction of the respective one of said upright sidewalls, said casing having two opposite side surfaces each of which is formed with an indentation for receiving said flange of a corresponding one of said upright sidewalls to permit said flange to slide therealong.

5. The concealable connector of claim 4, wherein said guiding groove is configured to have a substantially heart-shaped profile so as to have a pointed portion directed toward the housing edge, and an indented portion distal from the housing edge, said first end of said guiding rod being disposed at said pointed portion when said casing is in the slid-out state, said first end of said guiding rod being disposed at said indented portion when said casing is disposed in the concealed state.

6. The concealable connector of claim 4, wherein said guiding groove is configured to have a profile resembling the shape of a symmetric half of a heart.

7. The concealable connector of claim 4, wherein said guiding groove extends linearly in a direction perpendicular to the housing edge.

8. An electronic device comprising:
   a device body including:
      a housing having a base wall and a housing edge, said housing edge being provided with an opening, and
      an electronic component set disposed within said housing; and
   a concealable connector including:

two upright sidewalls spaced apart from each other and disposed on said base wall, said opening being in spatial communication with a space between said upright sidewalls;

a guiding groove formed in said base wall and disposed between said upright sidewalls;

a guiding rod having a first end that extends slidably into said guiding groove, and a second end;

a sliding module including a casing disposed between said upright sidewalls and formed with an insertion slot, said second end of said guiding rod being pivoted to said casing, said casing being slidable along said guiding groove by means of said guiding rod so as to be slidable relative to said upright sidewalls between a slid-out state, in which said casing projects outwardly of said housing through said opening and said insertion slot is exposed from said housing, and a concealed state, in which said insertion slot is concealed by said housing, a circuit board unit disposed in said casing, and an input/output port connected electrically to said circuit board unit and exposed through said insertion slot; and a spring to provide said casing with a resilient force to slide to the slid-out state, wherein one of said upright sidewalls is provided with a lateral guiding groove that extends in a direction the same as a sliding direction of said casing and is formed with a protruding mechanism which is disposed at one end of said lateral guiding groove distal from the housing edge, said sliding module further including a post projecting from one side of said casing and extending into said lateral guiding groove, and said spring abutting against said protruding mechanism and said post.

9. The electronic device of claim 8, wherein said guiding groove has a first positioning end and a second positioning end disposed farther from said housing edge of said housing than said first positioning end, said first end of said guiding rod being disposed at said first positioning end when said casing is disposed in the slid-out state, said first end of said guiding rod being disposed at said second positioning end when said casing is disposed in the concealed state.

10. The electronic device of claim 8, wherein said one of said upright sidewalls has one wall surface confronting the other of said upright sidewalls, and an opposite wall surface, said protruding mechanism being formed on and projecting from said opposite wall surface.

11. The electronic device of claim 8, wherein said upright sidewalls have confronting wall surfaces each of which is provided with a flange that extends along a lengthwise direction of the respective one of said upright sidewalls, said casing having two opposite side surfaces each of which is formed with an indentation for receiving said flange of a corresponding one of said upright sidewalls to permit said flange to slide therealong.

12. The electronic device of claim 11, wherein said guiding groove is configured to have a substantially heart-shaped profile so as to have a pointed portion directed toward said housing edge, and an indented portion distal from said housing edge, said first end of said guiding rod being disposed at said pointed portion when said casing is in the slid-out state, said first end of said guiding rod being disposed at said indented portion when said casing is disposed in the concealed state.

13. The electronic device of claim 11, wherein said guiding groove is configured to have a profile resembling the shape of a symmetric half of a heart.

14. The electronic device of claim 11, wherein said guiding groove extends linearly in a direction perpendicular to said housing edge.

\* \* \* \* \*